US012572165B2

(12) United States Patent
Tan et al.

(10) Patent No.: US 12,572,165 B2
(45) Date of Patent: Mar. 10, 2026

(54) SYSTEMS FOR AND METHODS FOR CLOCK CALIBRATION ADJUSTMENT FOR THREE-DIMENSIONAL INTERGRATED CIRCUITS (3DIC)

(71) Applicant: Avago Technologies International Sales Pte. Limited, Singapore (SG)

(72) Inventors: Cheng Huat Tan, Singapore (SG); Peter Lim, Singapore (SG); Antony Ilamchelian Kulandaisamy, Singapore (SG); Manjit Kaur, Singapore (SG); Sathish Abraham Selvaraj, Singapore (SG); Jiajun Zheng, Singapore (SG)

(73) Assignee: Avago Technologies International Sales Pte. Limited, Singapore (SG)

( * ) Notice: Subject to any disclaimer, the term of this patent is extended or adjusted under 35 U.S.C. 154(b) by 104 days.

(21) Appl. No.: 18/502,241

(22) Filed: Nov. 6, 2023

(65) Prior Publication Data

US 2025/0028350 A1     Jan. 23, 2025

Related U.S. Application Data

(60) Provisional application No. 63/514,995, filed on Jul. 21, 2023.

(51) Int. Cl.
G06F 1/08          (2006.01)

(52) U.S. Cl.
CPC ...................................... G06F 1/08 (2013.01)

(58) Field of Classification Search
CPC ...................................... G06F 1/08; G06F 1/10
See application file for complete search history.

(56) References Cited

U.S. PATENT DOCUMENTS

| | | | | | |
|---|---|---|---|---|---|
| 6,779,096 | B1 * | 8/2004 | Cornelius | ................. | G06F 1/10 |
| | | | | | 713/401 |
| 2003/0102892 | A1 * | 6/2003 | Meier | ................... | H03L 7/0812 |
| | | | | | 327/94 |
| 2006/0244642 | A1 * | 11/2006 | Fischer | ..................... | G06F 1/12 |
| | | | | | 341/120 |
| 2014/0035636 | A1 | 2/2014 | Toda | | |
| 2016/0013799 | A1 | 1/2016 | Li et al. | | |
| 2023/0085155 | A1 | 3/2023 | Malone et al. | | |

FOREIGN PATENT DOCUMENTS

EP          3 096 199  A1     11/2016

OTHER PUBLICATIONS

Foreign Action other than Search Report on non-Foley case related to US Dtd Dec. 18, 2024.

* cited by examiner

*Primary Examiner* — Raymond N Phan
(74) *Attorney, Agent, or Firm* — Foley & Lardner LLP

(57)          ABSTRACT

Clock calibration adjustments are provided. Some embodiments disclosed herein are related to a device. A device can include a first conductive element configured to receive a first signal at a first functional block. The device can include a second conductive element configured to convey the first signal to a second functional block of the device. The device can include a third conductive element to receive a second signal from the second functional block, the second signal varying from the first signal according to a phase-shift. The device can include a first circuit configured to determine the phase-shift between the first signal and the second signal. The device can include a second circuit configured to generate a third signal based on the phase-shift, the first signal, the second signal.

20 Claims, 6 Drawing Sheets

600

602
Receive a first signal

604
Convey the first signal

606
Receive a second signal

608
Determining a first phase-shift between the first signal and the second signal

610
Generate, responsive to the first phase-shift, a third signal according to a second phase-shift from the first signal

612
Provide the third signal

SYSTEMS FOR AND METHODS FOR CLOCK CALIBRATION ADJUSTMENT FOR THREE-DIMENSIONAL INTERGRATED CIRCUITS (3DIC)

CROSS-REFERENCE TO RELATED APPLICATION

This disclosure claims priority to U.S. Provisional Patent Application No. 63/514,995 filed Jul. 21, 2023, which is incorporated herein by reference in its entirety for all purposes.

FIELD OF THE DISCLOSURE

This disclosure generally relates to systems and methods for inter-block (e.g., inter-chip) clock networks. For example, the clock network can synchronize various operations of semiconductor devices.

BACKGROUND

The verification of timing constraints in digital designs, sometimes referred to as timing closure, can be challenging in modern digital devices. For example, devices can include various inter-related clock networks and large monolithic or multichip devices, such as stacked die devices (sometimes referred to as three-dimensional integrated circuits, or "3DICs"). Failure to achieve timing closure can result in latching or propagating unstable data, which may register or propagate an incorrect bit value, causing a logical error in a combinatorial circuit, or incorrect memory value. Conversely, design changes to achieve timing closure can include insertion of intermediate latches or other additional pipeline stages, reductions in a maximum frequency ($f_{max}$) of a device, or clock tree prioritization, which can displace critical path combinatorial circuits, any of which can decrease device performance.

SUMMARY

Tracking and recovering a clock between clock subdomains can increase timing margins of a system. Achieving timing closure in a 3DIC can impose additional variables such as inter-chip variables (e.g., process, voltage, or temperature (PVT), different cell libraries having various setup or hold times, different aging characteristics, or so forth). Through calibration and adjustment of clock signals at chip-to-chip boundaries (or other domain boundaries for various functional blocks), timing closure within each chip can be performed separately, and a multiphase generator can generate an adjusted clock signal between the chips (e.g., an offset is evaluated and mitigated). In some embodiments, the multiphase generator can include periodic updates, such as to compensate for a variability of a voltage and frequency scaling, or a temperature of a device over time. The multiphase generator can provide offset updates based on the sampled or received data.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
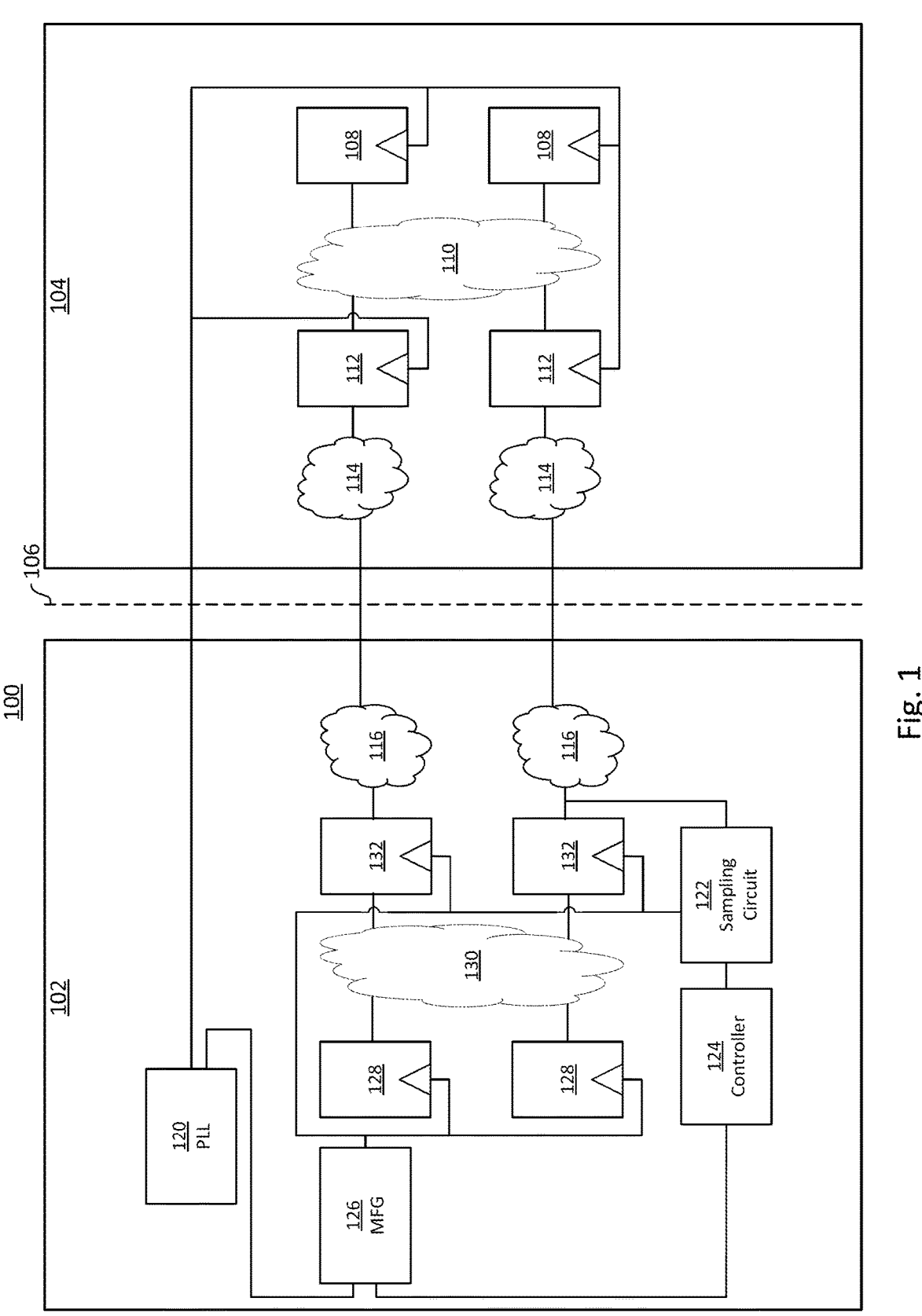
FIG. 1 is a block diagram depicting a system for clock calibration and adjustment in a three-dimensional integrated circuit (3DIC) device, according to some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Some embodiments disclosed herein are related to a device. The device can include a first conductive element configured to receive a first signal at a first functional block of the device. The device can include a second conductive element configured to convey the first signal to a second functional block of the device. The device can include a third conductive element configured to receive a second signal from the second functional block of the device, the second signal varying from the first signal according to a phase-shift. The device can include a first circuit configured to determine the phase-shift between the first signal and the second signal. The device can include a second circuit configured to generate a third signal based on the phase-shift, the first signal, the second signal, and the third signal having a same frequency.

In some embodiments, the first signal is a first clock signal input for the first functional block. The third signal can be a second clock signal input for the second functional block. The second signal can be a clock signal output from the second functional block.

In some embodiments, the first functional block is disposed on a first semiconductor die of the device. The second functional block can be disposed on a second semiconductor die of the device.

In some embodiments, the first semiconductor die is of a first node, and the second semiconductor die is of a second node, different from the first node.

In some embodiments, a first core voltage of the first semiconductor die varies from a second core voltage of the second semiconductor die.

In some embodiments, the first semiconductor die is configured to couple with multiple semiconductor dies including the second semiconductor die. The first circuit can be configured to determine multiple phase-shifts for each of the semiconductor dies. The second circuit can be configured to adjust a phase for each of the semiconductor dies.

In some embodiments, the first circuit is configured to compare the first signal to the second signal to generate a representation of the phase-shift to multiple predefined phases, and convey the representation to the second circuit. A third circuit is configured to select a predefined register value corresponding to the second circuit, the predefined register value corresponding to the phase-shift.

In some embodiments, the first circuit and the second circuit are components of an analog domain of the first functional block, and the third circuit is a component of a digital domain of the first functional block.

In some embodiments, the second circuit includes a multi-phase generator. The multi-phase generator can receive the first signal from a phase locked loop (PLL). The multi-phase generator can phase-shift the first signal to generate the third signal. The multi-phase generator can convey the third signal to the first functional block, wherein the first signal from the PLL is conveyed to the second functional block.

In some embodiments, the first conductive element includes a metal interconnect disposed over an active surface of the first semiconductor die. The second conductive element can include a first metal interconnect of a hybrid bond between the first semiconductor die and the second semiconductor die. The third conductive element can include a second metal interconnect of the hybrid bond.

Some embodiments disclosed herein are related to a system. The system can include a first semiconductor die and a second semiconductor die. The first semiconductor die can include a first conductive element configured to receive a first signal. The first semiconductor die can include a second conductive element configured to convey the first signal to a second semiconductor die. The first semiconductor die can include a third conductive element configured to receive a second signal from the second semiconductor die. The second signal can vary from the first signal according to a phase-shift. The first semiconductor die can include a first circuit configured to determine the phase-shift between the first signal and the second signal. The first semiconductor die can include a second circuit configured to generate a third signal based on the phase-shift, the first signal, the second signal, and the third signal having a same frequency.

In some embodiments, the first signal is a first clock signal input for the first semiconductor die. The third signal can be a second clock signal input for the second semiconductor die. The second signal can be a clock signal output from the second semiconductor die.

In some embodiments, the first semiconductor die is configured to couple with multiple semiconductor dies including the second semiconductor die. The first circuit can be configured to determine the phase-shift for each of the semiconductor dies. The second circuit can be configured to adjust a phase output for each of the semiconductor dies.

In some embodiments, the first circuit is configured to compare the first signal to the second signal to generate a representation of the phase-shift to a predefined phases, and convey the representation to a third circuit. The third circuit is configured to select a predefined register value, the predefined register value corresponding to the phase-shift.

In some embodiments, the first semiconductor die includes an analog domain and a digital domain. The analog domain can include the first circuit and the second circuit. The digital domain can include the second circuit.

In some embodiments, the second circuit includes a multi-phase generator. The multi-phase generator can receive the first signal from a phase locked loop (PLL). The multi-phase generator can phase-shift the first signal to generate the third signal. The multi-phase generator can convey the third signal to the first semiconductor die. The first signal from the PLL can be conveyed to the second semiconductor die.

Some embodiments disclosed herein are related to a method. The method can include receiving, at a first conductive element of a first semiconductor die, a first signal. The method can include conveying, by a second conductive element of the first semiconductor die, the first signal to a second semiconductor die. The method can include receiving, at a third conductive element of the first semiconductor die, a second signal. The method can include determining a first phase-shift between the first signal and the second signal. The method can include generating, responsive to the first phase-shift, a third signal according to a second phase-shift from the first signal. The method can include providing the third signal to combinatorial logic of the first semiconductor die.

In some embodiments, determining the first phase-shift includes comparing the first signal to the second signal to generate a representation of the first phase-shift to a set of predefined phases, and selecting a predefined register value, the predefined register value corresponding to the second phase-shift.

In some embodiments, the determination of the first phase-shift and the generation of the third signal are performed in an analog domain of the first semiconductor die. The selection of the predefined register value can be performed in a digital domain of the first semiconductor die including the combinatorial logic.

In some embodiments, generating the third signal includes receiving the first signal from a phase locked loop (PLL). Generating the third signal can further include phase-shifting the first signal to generate the third signal. Generating the third signal can further include conveying the third signal to the first semiconductor die, wherein the first signal from the PLL is conveyed to the second semiconductor die.

For clarity of the disclosure, before proceeding with further description of the systems and methods provided herein, illustrative descriptions of various terms are provided:

A functional block may refer to or include a physical or logical portion of a device, in some embodiments. For example, the functional blocks can include a semiconductor die, or portion thereof, a logical block of a schematic, or another logical or physical subdivision of a circuit. A functional block can include or span one or more semiconductor dies, be coextensive with a semiconductor die, or a semiconductor die can include various functional blocks. A semiconductor die may refer to or include a semiconductive material having an active surface, in some embodiments. The semiconductor die can include one or more metallization layers disposed over or connecting to the active surface of the semiconductor die. An active surface can refer to or include a surface including n-wells and p-wells for diodes and transistors, films or dopants for resistors, polysilicon resistors, capacitors, or other components for a circuit, in some embodiments. The metallization layers can interconnect elements of the active surface to form circuits.

Circuits can refer to or include combinations of components configured to generate, convey, or process signals.

Circuits can generate, convey, or process digital signals, analog signals, or combinations thereof. For example, a circuit or combination of circuits can include digital domains or analog domains. Digital domains may refer to or include domains configured to digitally encode or process information according to discrete values, in some embodiments. For example, digital domains can include combinatorial logic, such as NOR gates, NAND gates, AND gates, or other logic gates. Digital domains can include one or more clock-driven sequential elements (e.g., a flip-flop) intermediating combinatorial logic portions of a circuit. Combinatorial logic can refer to or include a circuit to produce an output mapped to one or more input values, in some embodiments. Analog domains may refer to or include domains including circuits configured to process non-discrete signal portions, such as a phase that can continuously vary, in some embodiments. Analog domains can include isolation elements to provide an isolation from a digital domain, such as separate or split ground planes, power supplies, or so forth.

A hybrid bond can refer to or include a bond between semiconductor dies (e.g., wafers), including bonded conductive and dielectric layers in some embodiments. For example, the bonds between the conductive elements can be between metal interconnects of the metallization layers, and be configured to pass signals between the various semiconductor dies. Molecular interactions between silicon or other semiconductive materials, or dielectrics formed there-over, can mechanically couple the wafers to each other. Metal interconnects can refer to or include metal connections between conductive elements, in some embodiments. For example, the metal interconnects can include interconnects between semiconductor dies, or between metallization layers over a semiconductor die. A conductive element can refer to or include a conductive material configured to pass electrical signals, in some embodiments. For example, the conductive element can include the metal interconnects.

A node of a semiconductor die may refer to or include a physical dimension of a feature thereof, or an assemblage of design rules for a semiconductor device, in some embodiments. For example, a node can include a 7 nm node, a 3 nm node, planar node, FinFET node, etc. The node, sometimes referred to as a process node or fabrication node, can include a physical dimension of a gate or channel structure, or design rules associated with a placement of the features thereof. A dimension of a node may indicate a literal dimension of a feature, or another node attribute (e.g., a relative density or power efficiency realizable according to a set of design rules, relative to other nodes). A node can correspond to operating temperatures, core voltages, or other operating characteristics. A core voltage can refer to or include a nominal voltage at which logic circuits of a semiconductor die operate, in some embodiments. The core voltage can vary according to a node, or an operating point thereof, the operating point corresponding to performance or power attributes.

A signal can refer to or include a variable indication of information or timing, in some embodiments. For example, a signal can include a clock signal. A clock signal can refer to or include a periodic signal configured to gate sequential logic devices such as flip-flops, in some embodiments. A frequency of a signal, such as a clock signal, can refer to or include a nominal periodicity of the signal, in some embodiments. The periodicity may vary according to temperature, voltage, manufacturing variances, and other aspects of semiconductor devices. A clock signal input can refer to or include a signal provided at an input to a circuit, in some embodiments. A clock signal output can refer to or include a signal received at an output from a circuit. A clock signal output can lead or lag in phase relative to a clock signal input. A phase-shift can refer to a temporal or phase difference between two signals of a same or related frequency, in some embodiments. For example, the phase-shift can be provided as a time (e.g., ns) or a phase (e.g., degrees).

A phase locked loop (PLL) may refer to or include a circuit to generate a clock signal, in some embodiments. For example, the PLL can produce a clock signal based on a clock input via a PLL system including a voltage controlled oscillator (VCO) having a frequency that is proportional to an input voltage. A multi-phase generator may refer to or include a circuit configured to generate an output that is phase-shifted relative to an input signal, in some embodiments. For example, the multi-phase generator can include a register to receive a predefined value. The predefined register value may refer to or include a digital value corresponding to a phase shift, in some embodiments. The register value may be referred to as a representation of the phase shift, in some embodiments. For example, a five-bit register including thirty-two values can correspond to phase shifts of 0°, 11.25°, 22.5°, and so forth.

Timing closure in 3DICs may be challenging, as the closure must account for variation between multiple semiconductor dies. The present disclosure provides systems and methods to track and recover a clock to improve timing margin. The systems and methods include a self-aligning calibration system. The systems and methods can be employed with various devices that send and receive data such as multichip devices, monolithic devices, printed circuit board assemblies, and so forth. The systems and methods can provide correct-by construction timing. The solution can be reused without substantial circuit customization. The systems and methods can track an increased timing margin for various IP paths, and can simplify and reduce resources for custom IP design.

FIG. 1 provides a block diagram depicting a system for clock calibration and adjustment in a three-dimensional integrated circuit (3DIC) device, according to some embodiments. The system can include multiple functional blocks. The functional blocks can refer to, for example, portions of a circuit disposed on one or more semiconductor dies, circuit boards, or other substrates. For example, the functional blocks can correspond to a semiconductor die of a multichip module (MCM). That is, a first functional block can include or be formed on an active surface of a first semiconductor die 102; a second functional block can include or be formed on an active surface of a second semiconductor die 104. A chip-to-chip interface 106 including various interconnects intermediates the first semiconductor die 102 from the second semiconductor die 104.

The first semiconductor die 102 or the second semiconductor die 104 can include manufacturing variances, such that a performance of logic elements can vary between instances or over time, temperature, voltage, or so forth. Performance of circuit elements can vary such that performance corners can be defined. A typical, T, performance (e.g., switching speed/latency) of two elements can be referred to as a typical-typical (TT) instance. A performance of a fast first element and fast second element (p-type transistors and n-type transistor) may be referred to as an FF corner, wherein elements exhibiting greater latency or switching speed can be referred to as an SS corner. Timing closure can be achieved by ensuring positive slack, according to various corners (FF, SF, FS, SS).

In an MCM, where various semiconductor dies or other functional blocks can be manufactured according to multiple nodes, or from separate wafers, variability can extend to each semiconductor die. For example, variability of a two-die MCM can include sixteen corners (FF-FF, FF-SF, FF-FS, FF-SS, SF-FF, etc.). Semiconductor dies or other functional blocks can include varying performance according to a voltage (e.g., core voltage) or temperature level (e.g., local hotspots), even where a circuit is formed on a monolithic die. Thus, for systems including various functional devices, clock calibration phase adjustments may be employed.

The first semiconductor die 102 can receive or generate a clock signal. For example, the first semiconductor die 102 can include a phase-locked-loop (PLL) 120 to generate the clock signal. The clock signal can be conveyed as an output to any number of dies or portions thereof (e.g., a circuit of the first semiconductor die 102 and a circuit of the second semiconductor die 104). For example, as depicted, the clock signal can be conveyed to a multi-phase generator 126 of the first semiconductor die 102, and various circuits of the second semiconductor die 104. A clock input (to the second semiconductor die 104) is derived from the clock output from the first semiconductor die.

In the depicted embodiment, the clock signal is conveyed to a first synchronous device 108 and second synchronous devices 112, wherein the first synchronous device 108 or second synchronous devices 112 can gate various combinatorial logic circuit portions of the second semiconductor die 104. The depicted embodiment is not intended to be limiting; various embodiments can include different number of synchronous stages, different synchronous devices, or so forth. For example, signals can be latched according to rising or falling edges, according to a propagation delay of combinatorial logic disposed between two or more synchronous devices. That is, according to various embodiments, synchronous devices or combinatorial logic can be added, omitted, substituted, or so forth.

The second semiconductor die 104 can include first combinatorial circuits 110 having clocks gated from an input thereto, from the first synchronous devices 108, and at an output thereof by the second synchronous devices 112. The various circuit elements of the second semiconductor die 104 can include circuit portions configured to perform functions of the device (e.g., microprocessor pipeline stages), or determine die performance (e.g., ring oscillators). A second combinatorial circuit 114 is configured to interface with the chip-to-chip interface 106 (e.g., may include digital logic, pullups, or level translation circuits). A clock signal can propagate across the chip-to-chip interface 106 from the second semiconductor die 104 to the first semiconductor die 102. For example, the clock signal can be returned as a discrete signal or embedded in a data stream, whereupon a sampling circuit 122 of the first semiconductor die 102 can recover the clock signal to determine characteristics (e.g., a phase) thereof.

A return path of the clock signal can pass through a third combinatorial circuit 116 of the first semiconductor die 102, which can include, for example, analogues to the digital logic, pullups, or level translation circuits of the second combinatorial circuit 114. In some embodiments, some portions of the depicted system 100 can be omitted. For example, the second combinatorial circuit 114 or third combinatorial circuit 116 can be omitted. Likewise, systems 100 can include additional or fewer links, such as one connection for a single-ended clock, two connections for a differential clock, or multiple links associated with multiple clocks (or multiple semiconductor dies, as depicted at FIG.

3). A clock signal can incur delay as it propagates from a source such as the depicted phase locked loop (PLL) 120 of the second semiconductor die 104, a crystal or microelectromechanical (MEMS) device, or other source, through the various interfaces, combinatorial and synchronous logic circuits, drivers, or other system 100 portions. The delay can vary according to temperature, voltage, silicon or dopant variations, or over a device age (e.g., responsive to effects of electromigration, and so forth). A clock signal measured by the sampling circuit 122 can include information as to such variability, such as phase information. The phase can be a phase of a discrete clock signal or a clock signal recovered from another signal such a synchronous serial interface.

A sampling circuit 122 of the first semiconductor die 102 can recover a phase-shift, representation thereof, or other information associated with the clock signal. For example, the sampling circuit 122 can receive the clock signal derived from the second semiconductor die 104. The sampling circuit 122 can further receive another clock signal derived from a same clock source as the second semiconductor die 104 (e.g., the PLL 120). A multi-phase generator (MFG) 126 is configured to phase-shift a signal received from the PLL. For example, the MFG 126 can generate an initial signal having a zero or non-zero phase-shift from the clock signal conveyed to the second semiconductor die 104, whereupon the sampling circuit 122 (e.g., a phase detector, such as an all-tap phase detector) can generate a representation of the phase shift. The representation can include, for example, a voltage level output (e.g., a positive or negative voltage corresponding to a leading or lagging signal), a pulse width output, or a binary output (e.g., a register value of a predefined numeric value mapped to a phase shift amount). The representation can include an analog or digital indication.

Another circuit, such as a controller 124 or other control circuitry, can select a register value corresponding to the representation of the phase-shift. The register value can be a predefined value corresponding to a phase-shift. For example, one or more discrete phase-shift values can correspond to a second phase-shift, which is equal to or different than the detected phase shift. For example, a second phase-shift can be a fixed offset from the first-phase shift, the second phase-shift configured to increase a slack, as is depicted henceforth, at FIG. 4 and FIG. 5. The controller 124 can be disposed in a digital domain of a semiconductor die and configured to interface across a mixed-signal domain to interface with the PLL 120 and MFG 126, the PLL 120 and MFG 126 being of an analog domain. Various representations of the phase-shift can vary from each other. For example, a first indication can include a voltage level, pulse width, or other analog domain indication of a phase shift; a first indication can include a digitally resolved value at the controller 124; a third indication can include another representation employed by the MFG 126.

The controller 124 can determine the phase shift incident to device fabrication. For example, the controller 124 can trip a register of one-time fuses to convey the representation of the phase-shift to the MFG 126. The controller 124 can determine the phase-shift at device power-up or boot. For example, the controller 124 can write a representation of the phase-shift to a register at device power-up, association, pairing, or so forth. The controller 124 can update a representation of the phase-shift (e.g., by over wiring a register value) during device operation. For example, the controller 124 can update the representation responsive to an event (e.g., a voltage or temperature change, or according to a periodic update).

The MFG 126 can generate, responsive to the receipt of a representation of the phase-shift of the signal from the controller 124, another clock signal of a phase offset from the clock signal received from the PLL 120 or other clock source. For example, the phase-shift can be configured to increase a slack along a timing path (sometimes referred to as a critical path).

The sampling circuit 122, controller 124, or MFG 126 can be integral to or separate from the first semiconductor die 102, or a semiconductor device including the first semiconductor die 102. Other dies can include corresponding sampling circuits 122, controllers 124, or MFGs 126, or corresponding logic circuits. The sampling circuit 122, controller 124, or MFG 126 can interface with further corresponding logic circuits. For example, the controller 124 can select a separate representation of a phase-shift for each semiconductor die or other functional block, or a phase-shift based on multiple representations. The controller 124 can receive further information during operation, such as voltage information, temperature information, or so forth from one or more dies of the system 100, such that the controller 124 can determine adjustment commands for the multi-phase generator 126. That is, semiconductor dies can include or interface with temperature, voltage, current, propagation delay, or other sensors.

Thus, when establishing timing closure, the system 100 including the multiple dies is not constrained by a full range of silicon variation, temperature variation, voltage variation, and so forth at a same time. For example, rather than establishing timing closure with a setup time variation of 5 nanoseconds (ns), corresponding to a population of dies, the variation can be reduced to 2 ns, corresponding to a particular die, wherein the controller 124 can make adjustments prior to or during system 100 operation. Moreover, such a system can be implemented in existing systems without additional changes to logic. That is, the phase or other clock properties of a third synchronous device 128 or fourth synchronous device 132 gating a third combinatorial circuit 130, can be offset of otherwise adjusted relative to the clock signal of the PLL 120. Such operation can increase a performance (e.g., increased $f_{max}$, decreased energy, or decreased pipeline stages) of the system.

Figure 2:
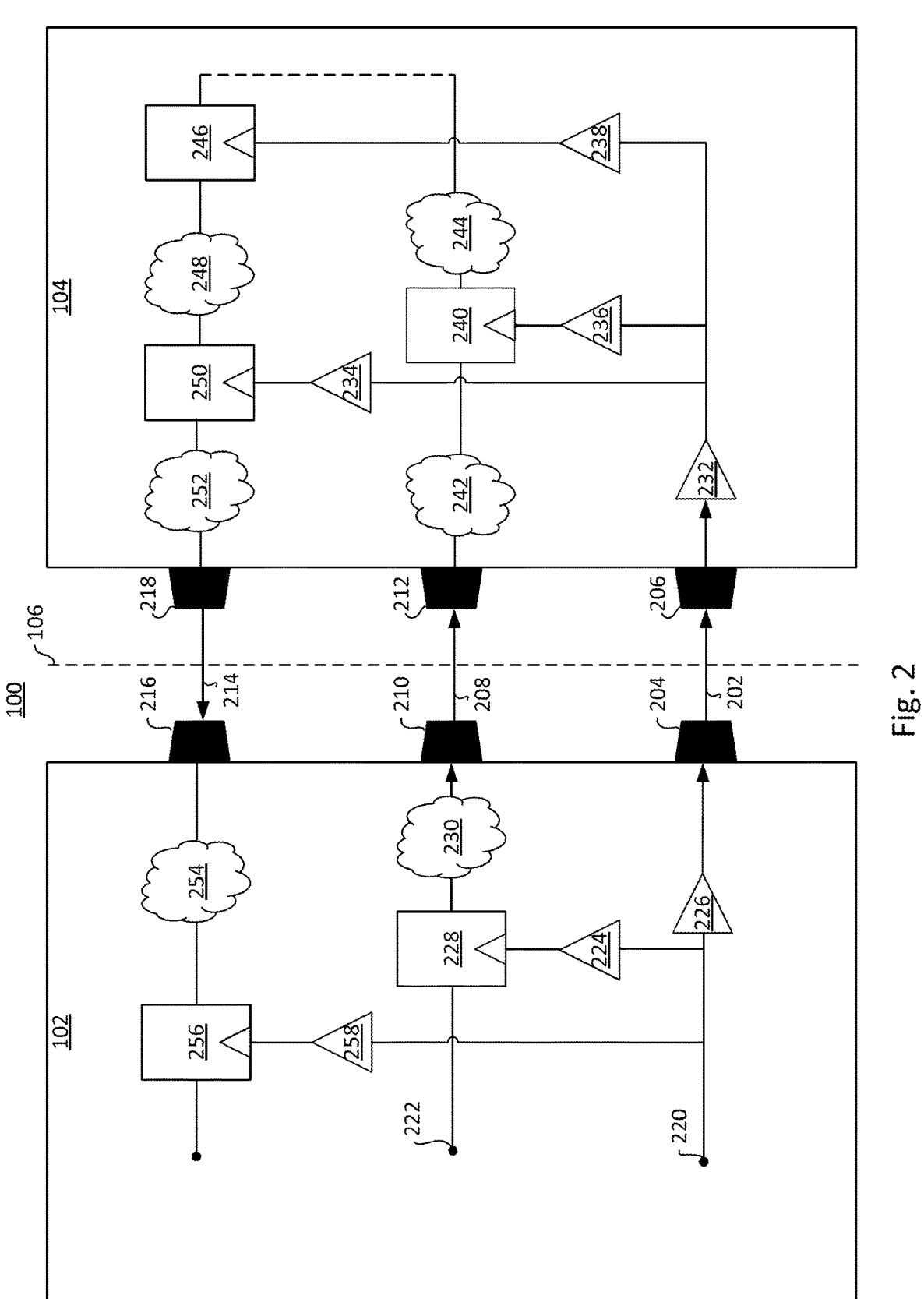
FIG. 2 is another schematic block diagram of a system for clock calibration and adjustment, according to some embodiments.

Referring now to FIG. 2, another schematic block diagram of a system for clock calibration and adjustment is provided. The block diagram depicts data paths between the first semiconductor die 102 and the second semiconductor die 104. Like other aspects of the present disclosure, references to semiconductor dies may be applied, in some embodiments, to functional clocks corresponding to a same monolithic die, circuit board, interposer, or so forth.

A clock input 202 is provided to the second semiconductor die 104 from the first semiconductor die 102. Particularly, the clock input 202 is provided by a conductive element 204 of the first semiconductor die 102 to a conductive element 206 of the second semiconductor die 104. The conductive elements 204, 206 can include, for example, terminals of a though silicon via (TSV) or other interlayer via (ILV), bumps, pillars, or so forth (e.g., a copper pillar of a hybrid bond). Further conductive elements can include metallization layers disposed over the respective dies.

Additional conductive elements can convey data signals, such as a forward data signal 208 from the first semiconductor die 102 to the second semiconductor die 104, via respective conductive elements 210, 212 of the first and second semiconductor dies 102, 104. The forward data signal 208 can include various values or states, as transformed according to a propagation through various circuit portions. The forward data signal 208 can be clocked based on the clock input 202, or can include an embedded clock (e.g., can be a digital link). A return data signal 214, likewise, can extend between respective conductive elements 216, 218 of the first and second semiconductor dies 102, 104. The return data signal 214 can correspond to the clock input 202 (e.g., according to an embedded clock), or a further clock can be passed along a return path from the second semiconductor die 104 to the first semiconductor die 102.

A clock network can include various gates for clocks. For example, the gates can include buffers configured to maintain clock integrity, or delay elements configured to adjust a clock skew based on, for example, a routing path for the clock. Additional or fewer gates can be provided, according to various environments. For example, the gates can be established, configured, or designed according to a circuit layout, according to various design rules (DRC). Particularly, a clock input 220 can be received by one or more gates, such as a first gate 224 gating circuits of the first semiconductor die 102. For example, the first gate 224 can convey a clock from a first synchronous device 228, for an input 222 for the forward data signal 208 configured to provide the forward data signal 208, which may be based on a first combinatorial circuit 230. A second gate 226 can convey a clock signal to the second semiconductor die 104.

Upon receipt, at the second semiconductor die 104, a third gate 232 can convey the clock from the clock input 202 to further gates (e.g., a fourth gate 234, fifth gate 236, or sixth gate 238) of the second semiconductor die 104. The gates 234, 236, 238 can convey the propagation of signals from respective synchronous devices. For example, a second synchronous device 240 can gate a signal received responsive to the forward data signal 208 (e.g., as transformed by a second combinatorial circuit 242), to provide a forward data signal 208 to a third combinatorial circuit 244 to further transform the forward data signal 208. According to various transforms, the return data signal 214 can be generated responsive to the forward data signal 208. Indeed, although referred to as a "forward data signal 208" and transformations thereof, and a "return data signal 214" and transformations thereof, a demarcation between a forward and return portion of a data path can vary according to convention, and is not intended to be limiting. As depicted, the return path includes a third synchronous device 246 gating a fourth combinatorial circuit 248, and a fourth synchronous device 250 gating a fifth combinatorial circuit 252, the fifth combinatorial circuit 252 providing the return data signal 214 across the chip-to-chip interface 106.

Each element of the first and second semiconductor dies 102, 104 can include a skew based on manufacturing variances, voltage levels, temperatures, or other attributes. Moreover, the chip-to-chip interface 106 can impose further variable delay or absolute delay, $\sigma$, such as a delay from the first semiconductor die 102 to the second semiconductor die 104 ($\sigma_{1\text{-}2}$), or a delay from the second semiconductor die 104 to the first semiconductor die 102 ($\sigma_{2\text{-}1}$). Thus, a clock signal input 202, as conveyed from the second gate 226, can be described according to a skew which is equal to a process variation ($\mu$) of the first semiconductor die 102 ($\mu_1$) and a skew ($\Delta$) imposed by an accumulation of circuit skew ($\Delta n_1$) of any circuits of the first semiconductor die. A total delay at an output towards the second semiconductor die 104 can be described according to $\mu_1 + \Delta n_1$ (e.g., wherein a delay, $\sigma$, for the clock signal input 202 and a delay, $\sigma$, for the forward data signal 208 are matched).

An input of the first semiconductor die 102 (e.g., a conductive element 216 configured to receive a signal of a return data signal 214) can receive a signal skewed by a delay $\sigma$ of the chip-to-chip interface 106, in combination with a skew of the second semiconductor die 104. That is, a portion of the skew may be represented as $\mu_2 + \Delta n_2$. The skew may be additive or subtractive, relative to the signal provided to the second semiconductor die 104, $\mu_1 + \Delta n_1$. Further, the chip-to-chip interface can contribute a delay, $\sigma_{1-2}$, $\sigma_{2-1}$, though a variability of such a delay may be somewhat consistent between signals (e.g., the chip-to-chip interface 106 can be substantially balanced for various connections).

Prior to a receipt, at a component of the first semiconductor die 102 (e.g., a sampling circuit 122), the signal can incur further skew, such as a sixth combinatorial circuit 254, gated by the clock of the clock input 220. Thereafter, the return signal can proceed to a return signal path which can include the sampling circuit 122, further logic, or so forth. The sixth combinatorial circuit 254 can be gated by a fifth synchronous device 256.

The gating of the fifth synchronous device 256 can be according to a variable gate 258. That is, the variable gate 258 can be a component of the MFG 126, whereupon the return signal can be gated according to a phase-shifted signal, phase shifted to increase a setup or hold slack. Such a phase-shift can be responsive to an accumulation of skew including the skew as received by the first semiconductor die 102, $\mu_1 + \Delta n_1 + \sigma_{21}$, and any additional manufacturing variance $\mu_2$ of the second semiconductor die 104, or imposed by an accumulation of circuit skew $\Delta n_2$ of the second semiconductor die 104. That is, the MFG 126 can adjust a gating of a received signal based on a cumulative (e.g., additive or subtractive) skew of $\mu_1 + \Delta n_1 + \sigma_{21} + \mu_2 + \Delta n_2$. Thus, a range of skews are possible to be received by the system 100. By determining a clock skew of a return signal, the system 100 can minimize variation, such that at design time, a design may not be configured to tolerate a full range of potential skew. Thus, a process variation skew can be adjusted for reducing total skew, wherein a remaining skew (e.g., temperature, aging, etc.) can be included in timing closure, or as described above, can be further defined by periodic calibration and adjustment or by receipt of further data by a controller 124 (e.g., an input of temperature, frequency, aging data, or so forth).

Figure 3:
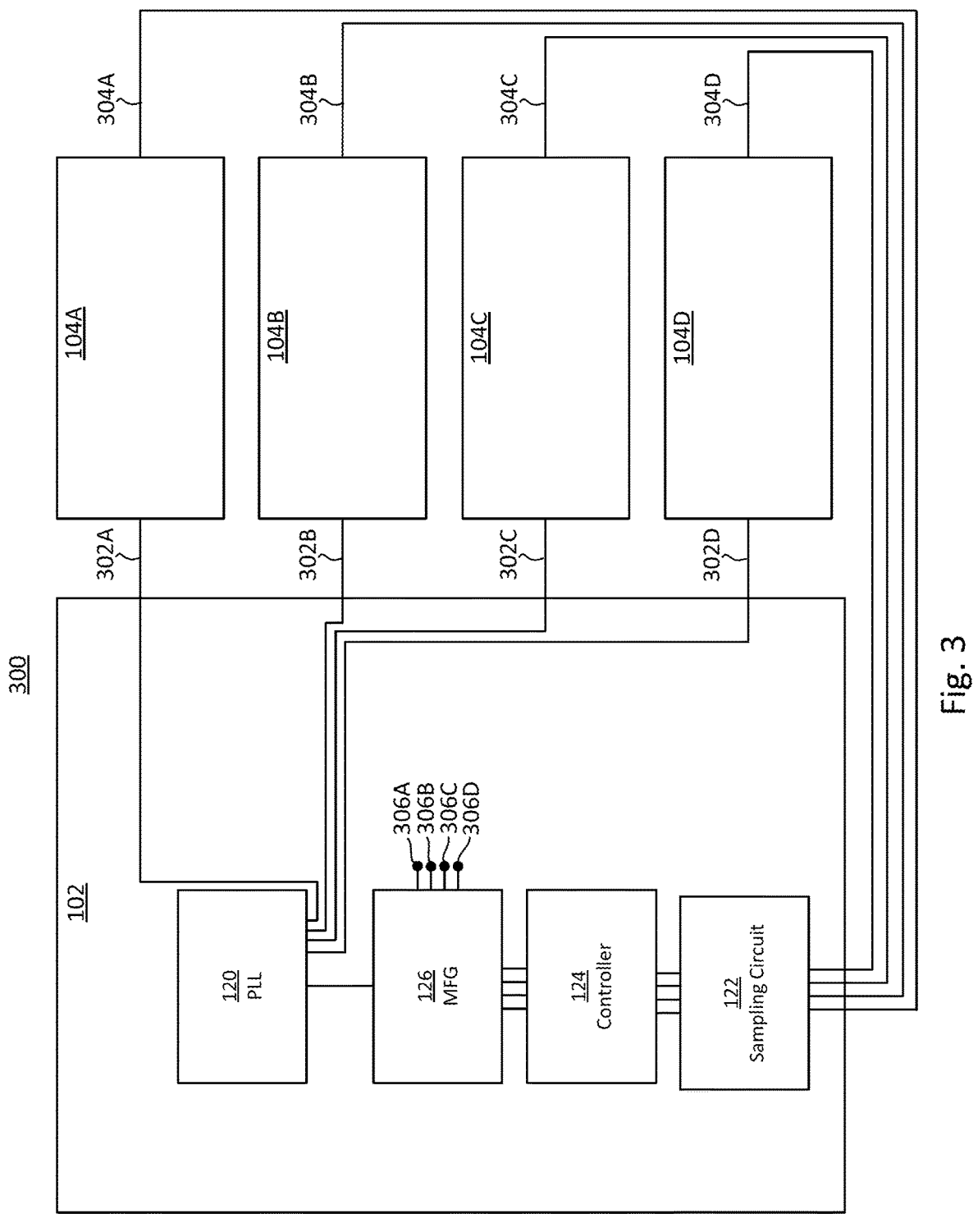
FIG. 3 is a schematic block diagram of a clock calibration and adjustment circuit, depicting a first die connected to various second dies, according to some embodiments.

Referring now to FIG. 3, another schematic block diagram 300 is provided, the schematic block diagram including a first semiconductor die 102 connected to various second semiconductor dies 104A, 104B, 104C, 104D, collectively, second semiconductor dies 104. A PLL 120 or other clock source can provide a same or separate clocks signal via respective conductive elements 302A, 302B, 302C, 302D. The various second semiconductor dies 104A, 104B, 104C, 104D can have various sequential and combinatorial logic, temperatures, voltage levels, or so forth, which can incur variable clock skewing. The various second semiconductor dies 104A, 104B, 104C, 104D can pass return signals to the first semiconductor die 102, via respective conductive elements 304A, 304B, 304C, 304D. For example, the return signals can include discrete clocks, or clocks recovered from data signals. The sampling circuit 122 can determine a phase-shift for signals corresponding to each of the second semiconductor dies 104, which may increase a timing margin at the first semiconductor die 102.

The controller 124 can cause the MFG 126 to adjust a phase for one or more of the signals. That is, the MFG 126 can receive a signal from the PLL 120 and a signal from the second semiconductor dies 104 to generate a signal based thereupon. For example, the MFG 126 can generate a first clock signal 306A, second clock signal 306B, third clock signal 306C, and fourth clock signal 306D, to gate a data signal received from the respective second semiconductor dies 104. The clock signal can be generated by a buffer, delay, element, or other MFG 126 portion. For example, the clock signals can be generated according to one or more steps corresponding to a phase shift according to a register value mapped to a phase shift stepping.

Figure 4:
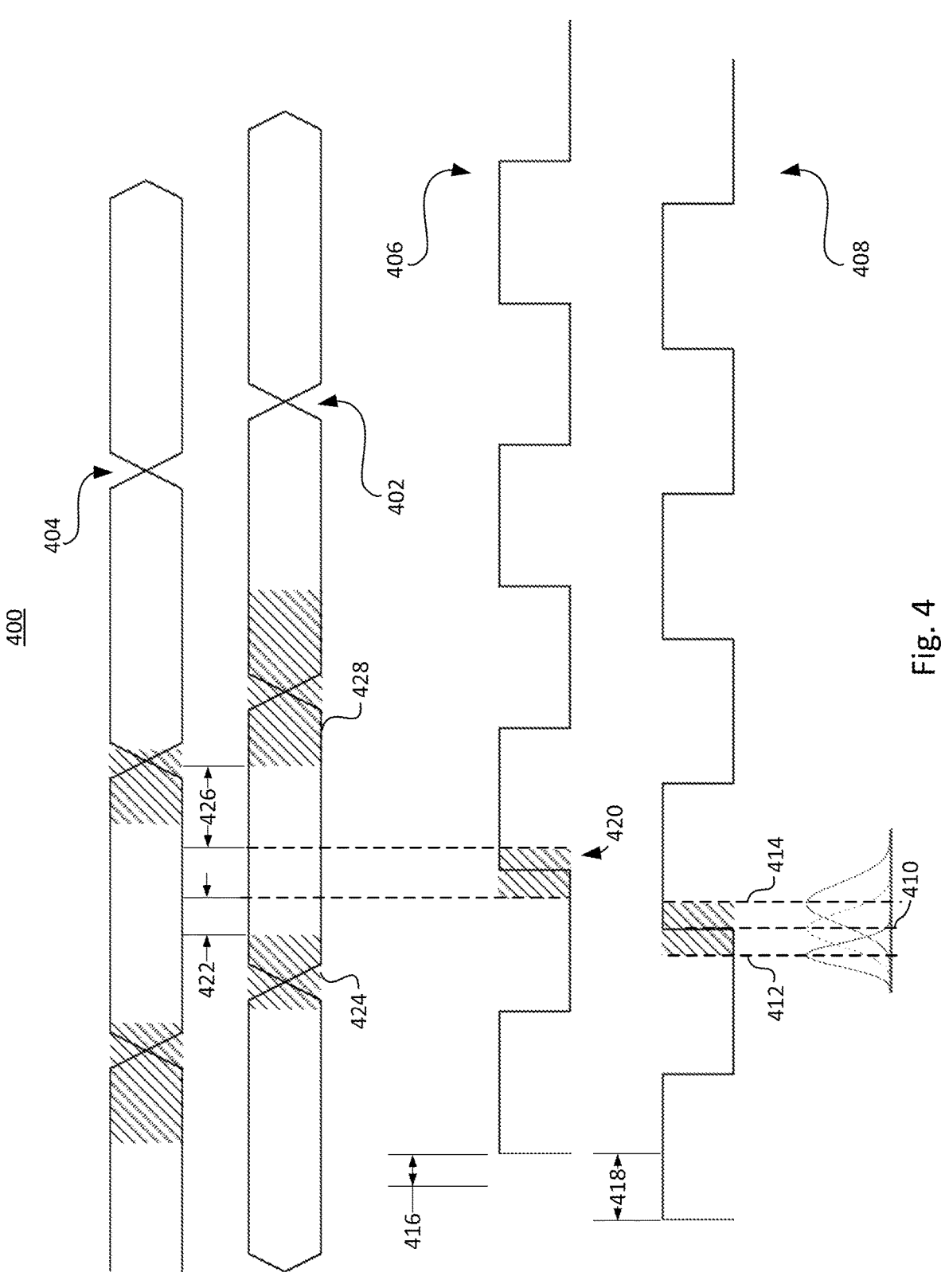
FIG. 4 depicts a representation of a transition of a data signal between first and second dies, according to some embodiments.

Referring now to FIG. 4, a representation 400 of a transition of a data path of a second semiconductor die 104 to a first semiconductor die 102 is depicted. The data path propagates from a second data signal 404 propagating according to an FF corner of the second semiconductor die 104, to a first data signal 402 propagating according to an SS corner of the first semiconductor die 102. The data signals 402, 404 are depicted along with corresponding clock signals, depicted as a first clock signal 406 of the first semiconductor die 102 and a second clock signal 408 of the second semiconductor die 104.

An example of a typical (TT) signal 410 is provided corresponding to a nominal clock transition time of the second clock 408. According to time, temperature, fabrication process, supply voltage, number of stages (e.g., clock cycles) in a pipeline for data flow, or other variation across a semiconductor die or population thereof. Some signals may propagate faster, such that the clock transitions sooner, as depicted by the FF signal 412, or according to a delay, as depicted by the SS signal 414. That is, the signal may arrive temporally earlier (as depicted), or a circuit may resolve a lower or higher voltage to a defined state, such that a signal is resolvable sooner. The window between the arrival of the FF signal 412 and the SS signal 414 can be referred to as clock uncertainty 420, or as a setup and hold time, relative to a stable data signal.

A phase-shift 416 for the first clock signal 406, can be defined according to setup and hold times associated with information associated with the first data signal 402. The phase-shift 416 can extend for a time which is less than an offset 418 between the first clock 406 and the second clock 408. That is, the phase-shift 416 can be relative to a predefined offset 418 from the second clock 408. The phase-shift 416 can be configured to maintain a separation between a data sampling period (e.g., a setup and hold time or clock uncertainty 420) of a rising edge of the second clock 408). The separation can be to center or otherwise increase a spacing with a setup or hold time (or decrease an overlap with a setup or hold time).

As depicted, the phase-shift 416 of the first clock 406 can be aligned with a stable data signal, by adjusting a setup slack 422 between a closure of one setup and hold time 424 and a clock uncertainty of the rising edge of the first clock 406. Further, a hold slack 426 defines a margin between a closure of the uncertainty of the rising edge of the clock with a subsequent opening of another setup and hold time 428.

The positions of the setup and hold times can vary according to a relative performance of the first semiconductor die 102 and second semiconductor die 104 (e.g., according to a temperature, fabrication process, or supply voltage). For example, as depicted, the SS corner of the first die 102 can correspond to a setup and hold time 424 extending beyond nominal, such that a clock uncertainty 420 can overlap therewith, absent a phase-shift of the second clock 408. That is, the phase-shift 416 of the second clock 408 can be greater than the setup slack 422.

Figure 5:
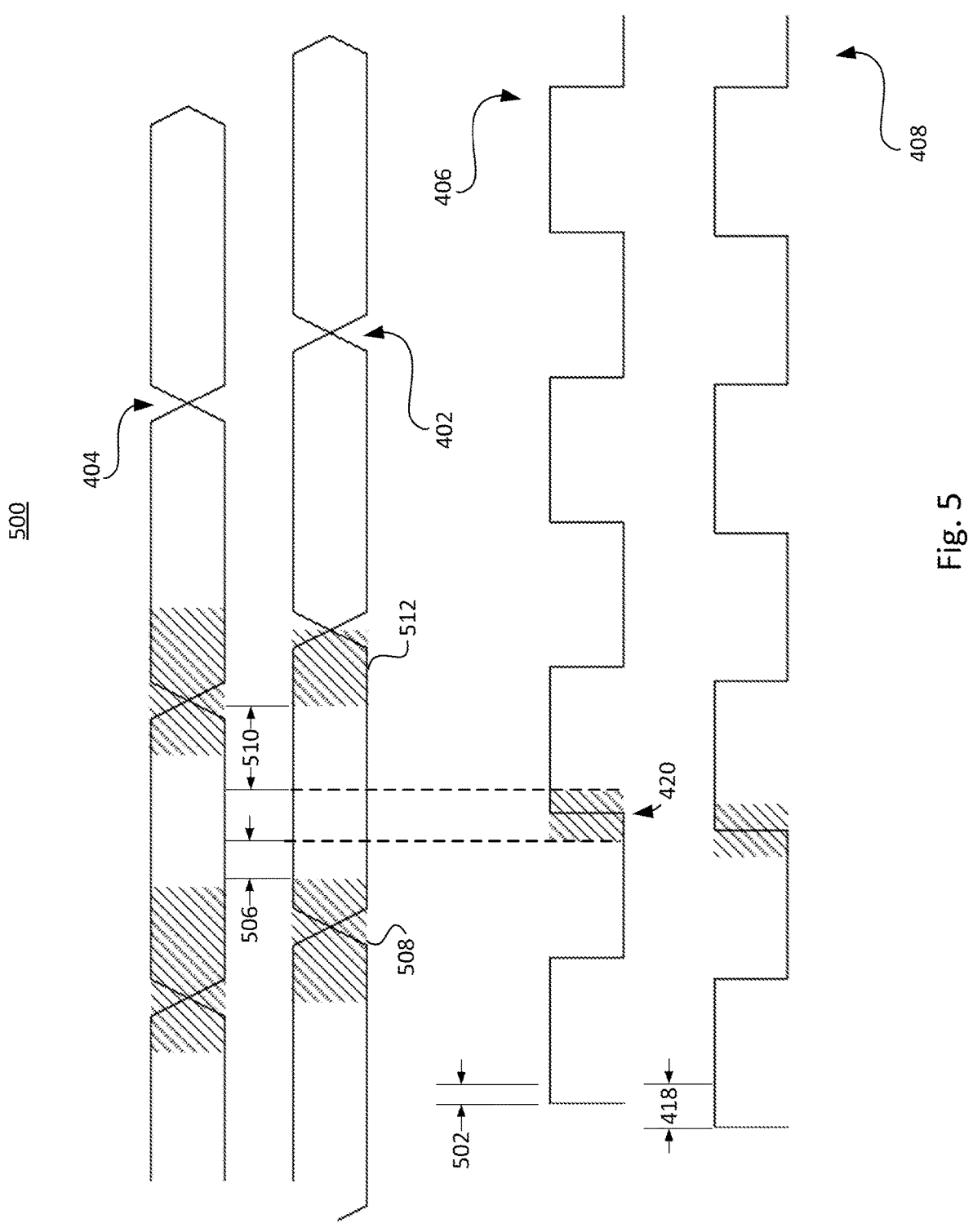
FIG. 5 depicts another representation of a transition of a data signal between first and second dies, according to some embodiments.

Referring now to FIG. 5, another representation 500 of a transition of a data path of another instance of the second semiconductor die 104 to another instance of the first semiconductor die 102 is depicted. The data path propagates from a second data signal 404 propagating according to an SS corner of the second semiconductor die 104, to a first data signal 402 propagating according to an FF corner of the first semiconductor die 102. The data signals 402, 404 are depicted along with corresponding clock signals, depicted as a first clock signal 406 of the first semiconductor die 102 and a second clock signal 408 of the second semiconductor die 104.

A phase-shift 502 for the first clock signal 408, is negative, relative to the phase-shift 416 of FIG. 4. The phase-shift 502 is positive, relative to an offset 418 between the first clock 406 and the second clock 408. Like the phase-shift 416 of FIG. 4, the depicted phase-shift 502 can be configured to increase a timing margin. That is, the phase-shift 502 can increase a hold slack 510 or a setup slack 506. For example, the phase-shift 502 can be configured to a center the clock uncertainty 420 between the preceding setup and hold period 508 and a subsequent setup and hold period 512. The phase-shift 502 can improve slack, wherein the performance of a particular die or a population of dies may be improved.

Figure 6:
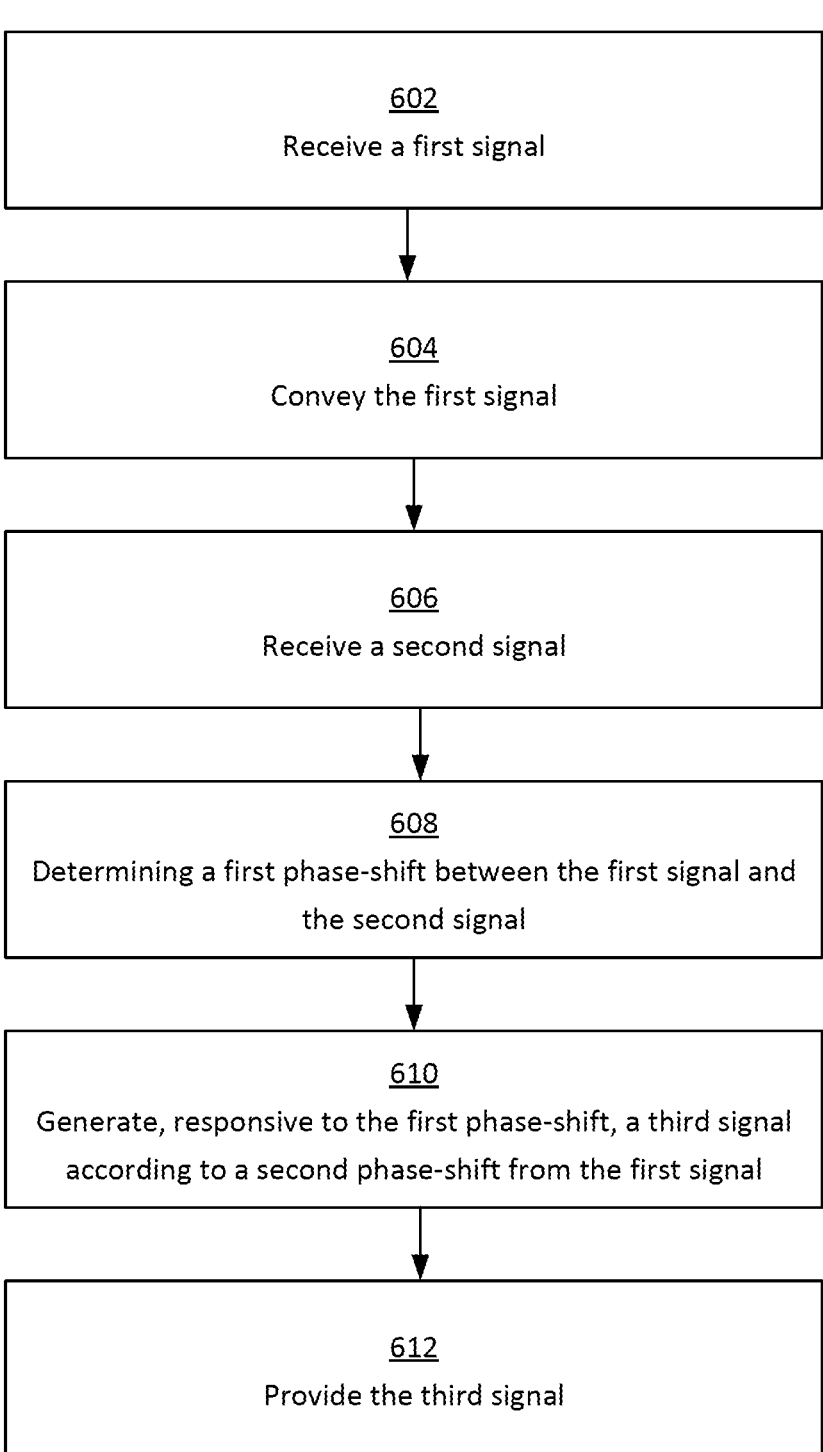
FIG. 6 is a flow diagram showing operations for a method of circuit operation, according to some embodiments.

Referring now to FIG. 6, is a flow diagram showing operations for a method 600 of circuit operation, according to some embodiments. At operation 602, a first signal is received. The signal can be received from a component of a first semiconductor die 102, such as a PLL 120 or other portion of a clock network, or a crystal oscillator, micro-electromechanical system (MEMS) oscillator, or other device external to the die. The signal can be, include, or be derived from a periodic clock signal. The signal can be received at one or more conductive elements, such as a device interconnect, terminal, or the like.

At operation 604, the first signal is conveyed to a second semiconductor die 104. The signal can be conveyed by another conductive element. The signal can be conveyed via micro bumps, interposers, via structures, copper pillars, etc. For example, the signal can be conveyed between respective interconnects of a hybrid bond. The hybrid bond can include numerous connections, such that other signals (e.g., data signals) provided along with the signal (e.g., gated by the clock signal) may include similar propagation delay across the bond interface. The conveyance can be along any number of conductive elements, such as symmetrical connectors of two semiconductor dies.

At operation 606, a second signal is received at the first semiconductor die 102. The second signal can be derived from the signal of operations 602 and 604. For example, the second signal can be an output of one or more circuits for which the signal of operations 602 or 604 is an input (e.g., an input clock to a synchronous device). The second signal can be or include a same frequency as the first signal. For example, the second signal can be a phase shifted instance of the first signal, or can be a digital stream including a clock at a same frequency as the first signal. An offset may vary according to a fabrication, temperature, voltage, or other attribute of the first semiconductor die 102, the second semiconductor die 104, or another component such as an interconnect, dielectric, of other device portion.

At operation 608, a first phase-shift is determined. For example, a sampling circuit 122 can determine a phase-shift based on the signal of operation 602 and the second signal of operation 606. For example, in some embodiments, the phase-shift can be a shift between the signal of operation 602 and the second signal of operation 606. In some embodiments, the phase-shift of the second signal is a phase-shift from a predefined offset from the signal of operation 602. For example, the predefined offset can be a population level setting for an offset between two semiconductor dies, and the determined phase-shift can be an adjustment thereto.

At operation 610, a third signal is generated based on the phase-shift. For example, the third signal can be an output clock configured to interface, at a first semiconductor die 102, with a signal received from a data path including the second semiconductor die 104. The generated signal can be configured to increases a setup or hold slack (e.g., to temporally center a clock transition with stable data). The adjustment can include, for example, a register value mapping to a phase shift, such that a controller can register a phase shift according to a predefined increment (e.g., one degree, five degrees, or so forth). That is, a predefined offset can be selected to increase a setup slack or hold slack. At operation 612, the third signal is provided to combinatorial logic of the first semiconductor die 102. For example, the provision can be via a synchronous device configured to gate the data path extending from the second semiconductor die 104.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., reader elements, writer elements, or magnetic media) that can operate within a system or environment. It should be understood that the systems described above can provide multiple ones of any or each of those components and these components can be provided on either a stand-alone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code. Further, the systems and methods described above can be provided as hardware circuits (e.g., finite state machines) defined according to a register transfer logic (RTL) language such as VHDS, Verilog. System Verilog, or the like.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical (e.g., magnetic), or fluidic.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A device, comprising:
a first conductive element configured to receive a first signal at a first functional block of the device;
a second conductive element configured to convey the first signal to a second functional block of the device;
a third conductive element configured to receive a second signal from the second functional block of the device, the second signal varying from the first signal according to a phase-shift;
a first circuit configured to determine the phase-shift between the first signal and the second signal; and
a second circuit configured to generate a third signal based on the phase-shift, the first signal, the second signal, and the third signal having a same frequency.

2. The device of claim 1, wherein:
the first signal is a first clock signal input for the first functional block;
the third signal is a second clock signal input for the second functional block; and
the second signal is a clock signal output from the second functional block.

3. The device of claim 1, wherein the first functional block is disposed on a first semiconductor die of the device, and the second functional block is disposed on a second semiconductor die of the device.

4. The device of claim 1, wherein:
the first circuit is configured to compare the first signal to the second signal to generate a representation of the phase-shift to a plurality of predefined phases, and convey the representation to the second circuit; and
a third circuit is configured to select a predefined register value corresponding to the second circuit, the predefined register value corresponding to the phase-shift.

5. The device of claim 1, wherein the second circuit comprises a multi-phase generator configured to:
receive the first signal from a phase locked loop (PLL);
phase-shift the first signal to generate the third signal; and convey the third signal to the first functional block, wherein the first signal from the PLL is conveyed to the second functional block.

6. The device of claim 3, wherein the first semiconductor die is of a first node, and the second semiconductor die is of a second node, different from the first node.

7. The device of claim 3, wherein a first core voltage of the first semiconductor die varies from a second core voltage of the second semiconductor die.

8. The device of claim 3, wherein:
the first semiconductor die is configured to couple with a plurality of semiconductor dies comprising the second semiconductor die;
the first circuit is configured to determine a plurality of phase-shifts for each of the plurality of semiconductor dies; and
the second circuit is configured to adjust a phase for each of the plurality of semiconductor dies.

9. The device of claim 3, wherein:
the first conductive element comprises a metal interconnect disposed over an active surface of the first semiconductor die;
the second conductive element comprises a first metal interconnect of a hybrid bond between the first semiconductor die and the second semiconductor die; and
the third conductive element comprises a second metal interconnect of the hybrid bond.

10. The device of claim 4, wherein:
the first circuit and the second circuit are components of an analog domain of the first functional block, and the third circuit is a component of a digital domain of the first functional block.

11. A system, comprising:
a first semiconductor die comprising:
a first conductive element configured to receive a first signal;
a second conductive element configured to convey the first signal to a second semiconductor die;
a third conductive element configured to receive a second signal from the second semiconductor die, the second signal varying from the first signal according to a phase-shift;
a first circuit configured to determine the phase-shift between the first signal and the second signal; and
a second circuit configured to generate a third signal based on the phase-shift, the first signal, the second signal, and the third signal having a same frequency; and
the second semiconductor die.

12. The system of claim 11, wherein:
the first signal is a first clock signal input for the first semiconductor die;
the third signal is a second clock signal input for the second semiconductor die; and
the second signal is a clock signal output from the second semiconductor die.

13. The system of claim 11, wherein:
the first semiconductor die is configured to couple with a plurality of semiconductor dies comprising the second semiconductor die;
the first circuit is configured to determine the phase-shift for each of the plurality of semiconductor dies; and
the second circuit is configured to adjust a phase output for each of the plurality of semiconductor dies.

14. The system of claim 11, wherein:
the first circuit is configured to compare the first signal to the second signal to generate a representation of the phase-shift to a plurality of predefined phases, and convey the representation to a third circuit; and the third circuit is configured to select a predefined register value, the predefined register value corresponding to the phase-shift.

15. The system of claim 11, wherein the first semiconductor die comprises:

an analog domain comprising the first circuit and the second circuit; and a digital domain comprising the second circuit.

16. The system of claim 11, wherein the second circuit comprises a multi-phase generator configured to:

receive the first signal from a phase locked loop (PLL);

phase-shift the first signal to generate the third signal; and convey the third signal to the first semiconductor die, wherein the first signal from the PLL is conveyed to the second semiconductor die.

17. A method comprising:

receiving, at a first conductive element of a first semiconductor die, a first signal;

conveying, by a second conductive element of the first semiconductor die, the first signal to a second semiconductor die;

receiving, at a third conductive element of the first semiconductor die, a second signal;

determining a first phase-shift between the first signal and the second signal;

generating, responsive to the first phase-shift, a third signal according to a second phase-shift from the first signal; and providing the third signal to combinatorial logic of the first semiconductor die.

18. The method of claim 17, wherein determining the first phase-shift comprises:

comparing the first signal to the second signal to generate a representation of the first phase-shift to a plurality of predefined phases; and selecting a predefined register value, the predefined register value corresponding to the second phase-shift.

19. The method of claim 17, wherein generating the third signal comprises:

receiving the first signal from a phase locked loop (PLL);

phase-shifting the first signal to generate the third signal; and conveying the third signal to the first semiconductor die, wherein the first signal from the PLL is conveyed to the second semiconductor die.

20. The method of claim 18, wherein:

the determination of the first phase-shift and the generation of the third signal are performed in an analog domain of the first semiconductor die; and the selection of the predefined register value is performed in a digital domain of the first semiconductor die, the digital domain comprising the combinatorial logic.

* * * * *